(12) United States Patent
Shin et al.

(10) Patent No.: US 9,098,792 B2
(45) Date of Patent: Aug. 4, 2015

(54) PRINT CONTROLLING APPARATUS, IMAGE FORMING APPARATUS, METHOD OF COLOR REVISING AND COMPUTER-READABLE RECORDING MEDIUM

(71) Applicant: Samsung Electronics Co., Ltd, Suwon-si, Gyeonggi-do (KR)

(72) Inventors: Jae-min Shin, Seoul (KR); Nam-ju Shin, Suwon-si (KR); Hyun-soo Oh, Suwon-si (KR); Woo-jun Chung, Suwon-si (KR); Kyeong-man Kim, Yongin-si (KR); Eun-ah Song, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/100,049

(22) Filed: Dec. 9, 2013

(65) Prior Publication Data

US 2014/0168674 A1    Jun. 19, 2014

(30) Foreign Application Priority Data

Dec. 13, 2012  (KR) .......................... 10-2012-0145448

(51) Int. Cl.
  *H04N 1/46* (2006.01)
  *G06K 15/02* (2006.01)
  *H04N 1/60* (2006.01)
  *H04N 1/00* (2006.01)

(52) U.S. Cl.
  CPC ........ *G06K 15/1802* (2013.01); *H04N 1/00278* (2013.01); *H04N 1/60* (2013.01); *H04N 1/6055* (2013.01)

(58) Field of Classification Search
  None
  See application file for complete search history.

(56) References Cited

U.S. PATENT DOCUMENTS

| | | | |
|---|---|---|---|
| 5,491,568 A * | 2/1996 | Wan .............................. | 358/518 |
| 7,333,136 B2 * | 2/2008 | Takemoto ................... | 348/222.1 |
| 7,385,739 B2 * | 6/2008 | Ohga et al. ..................... | 358/518 |
| 7,417,763 B2 * | 8/2008 | Saito .............................. | 358/1.9 |
| 8,223,399 B1 * | 7/2012 | Lee et al. ........................ | 358/1.9 |
| 8,508,789 B2 * | 8/2013 | Yamada ......................... | 358/1.2 |
| 8,705,122 B2 * | 4/2014 | Matsuzaki ..................... | 358/1.9 |
| 2003/0090688 A1 | 5/2003 | Kimura | |
| 2004/0190022 A1 * | 9/2004 | Kiyohara ........................ | 358/1.9 |
| 2009/0015852 A1 * | 1/2009 | Kim et al. ....................... | 358/1.9 |
| 2009/0296155 A1 * | 12/2009 | Shitara et al. ................ | 358/3.06 |
| 2012/0169719 A1 * | 7/2012 | Kim et al. ...................... | 345/419 |

FOREIGN PATENT DOCUMENTS

| | | |
|---|---|---|
| EP | 1294177 | 3/2003 |
| EP | 2131567 | 12/2009 |

OTHER PUBLICATIONS

Extended European Search Report issued on Mar. 20, 2014.
Extended European Search Report dated Apr. 30, 2015 from European Patent Application No. 15150700.1, 6 pages.

* cited by examiner

*Primary Examiner* — Dung Tran
(74) *Attorney, Agent, or Firm* — Staas & Halsey LLP

(57) ABSTRACT

A print controlling apparatus includes a storage to store a plurality of color feature information, an acquirer to acquire color feature information of a second image forming apparatus, a moderator to moderate color converting table of a first image forming apparatus by using the acquired color feature information and the plurality of color feature information stored in the storage, and a controller to perform printing jobs regarding the first image forming apparatus by using the moderated color converting table.

25 Claims, 10 Drawing Sheets

PRINT CONTROLLING APPARATUS, IMAGE FORMING APPARATUS, METHOD OF COLOR REVISING AND COMPUTER-READABLE RECORDING MEDIUM

CROSS-REFERENCE TO RELATED APPLICATIONS

This application claims priority under 35 U.S.C. §119(a) from Korean Patent Application No. 10-2012-0145448, filed on Dec. 13, 2012 in the Korean Intellectual Property Office, the disclosure of which is incorporated herein by reference in its entirety.

BACKGROUND OF THE INVENTION

1. Field of the Invention

The present general inventive concept relates to a print controlling apparatus, an image forming apparatus, a method of color revising and computer-readable recording medium thereof, and more specifically, to a print controlling apparatus that can revise colors so as to have output features as desired by a user, an image forming apparatus, a method of revising colors and a computer-readable recording medium thereof.

2. Description of the Related Art

Generally, image forming apparatuses operate to print printing data generated at a print controlling apparatuses onto a recording medium. Examples of such image forming apparatuses include a copy machine, a printer, a scanner, a facsimile or a multi-function peripheral (MFP) that implements the above functions of copying, printing, scanning, and faxing within one complex apparatus.

Image forming apparatuses have their own color features implemented according to manufacturers' recommendations or to specific product models. Color features may be characteristics of toner or ink used by each manufacturer or may be policy related with color matching.

When a user exchanges a previously used image forming apparatus with a new image forming apparatus, he or she may be satisfied with the color features implemented in the new image forming apparatus. However, a user may want to keep color features of the previously used image forming apparatus while utilizing a new apparatus.

Therefore, conventional image forming apparatuses collect color information of the used image forming apparatus, and revise color matching (gamut mapping) of the new image forming apparatus using the collected color information.

However, conventional methods have difficulties in implementing satisfactory colors according to particular time points or particular situations. Specifically, toner features or ink features of new image forming apparatus to implement colors to be pursued as objective are different from those of the used image forming apparatus, and is the differences may be considerably large. Thus, there are differences in ranges and features of color implementation. Further, it may happen that writing files or printing files used to collect colors cannot reflect color features sufficiently. In view of the above facts, conventional methods of implementing color operation may cause degradation of color in a specific color area or a portion of a gamut boundary.

SUMMARY OF THE INVENTION

The present general inventive concept provides a print controlling apparatus, an image forming apparatus, a color revising method and a computer-readable recording medium, according to which color revising is operated by utilizing specific information of prestored color features so that a user can have output features as he/she wants.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a print controlling apparatus including a storage to store a plurality of color feature information, an acquirer to acquire color feature information of a second image forming apparatus, a moderator to moderate color converting table of the first image forming apparatus by using the acquired color feature information and the plurality of color feature information stored in the storage, and a controller to perform printing jobs regarding the first image forming apparatus by using the moderated color converting table.

plurality of stored color feature information are an International Color Consortium (ICC) profile or a color converting table regarding each of the first and second image forming apparatuses, which are different from one another.

The first and second image forming apparatuses have at least one difference in manufacturers, product class, and products.

The print controlling apparatus may additionally include a communicating interface to communicate with the second image forming apparatus and a scanner. The acquirer may control the communicating interface to print the prestored color charts in the second image forming apparatus, and acquires the color feature information of the second image forming apparatus by using the received scan image, if the scan image corresponding to scanned charts printed by the second image forming apparatus is received through the communicating interface.

The color charts may include a plurality of colors regarding each of achromatic colors, bright colors, skin colors, and color gamut boundary.

The moderator may select a stored color feature information from among the plurality of stored color feature information that is most similar to the acquired color feature information, and may moderate the color converting table regarding the first image forming apparatus by using the selected color feature information and the acquired color feature information.

The moderator may moderate the color converting table of the first image forming apparatus by combining color values of the selected color feature information and color values of the acquired color feature information regarding each of color ranges corresponding to a predetermined ratio.

The moderator may moderate the color converting table of the first image forming apparatus by using color values of the acquired color feature information regarding color ranges included in the acquired color feature information or by using color values of the selected color feature information regarding color ranges excluded in the acquired color feature information.

Meanwhile, the print controlling apparatus may additionally include a user interface to display a user interface window including a first area displaying a matching degree as compared to the acquired color feature information regarding each of the plurality of stored color feature information and a second area receiving selection on one of the plurality of stored color feature information. The moderator may moderate the color converting table of the first image forming apparatus by using the selected color feature information on the second area and the acquired color feature information.

The foregoing and/or other features and utilities of the present general inventive concept may also be achieved by providing an image forming apparatus may include a storage to store a plurality of color feature information and color converting table, a communicating interface to transmit color charts to a different image forming apparatus, a scanner to scan color charts printed by the different image forming apparatus, a moderator to moderate the color converting table by using the scanned color charts and the plurality of color feature information, and an image former to perform printing jobs by using the moderated color converting table.

The plurality of stored color feature information are an International Color Consortium (ICC) profile or a color converting table regarding each of the first and second image forming apparatuses, which are different from one another.

The foregoing and/or other features and utilities of the present general inventive concept may also be achieved by providing a color revising method includes acquiring color feature information of a second image forming apparatus, selecting one from a plurality of prestored color feature information by using the acquired color feature information, and moderating a color converting table of the first image forming apparatus by using the selected color feature information and the acquired color feature information.

The plurality of stored color feature information are an International Color Consortium (ICC) profile or a color converting table regarding each of the first and second image forming apparatuses, which are different from one another.

The first and second image forming apparatuses have at least one difference in manufacturers, product class, and products.

The color revising method may additionally include transmitting prestored color charts to the second image forming apparatus and receiving a scan image regarding scanned charts printed by the second image forming apparatus. The acquiring may acquire color feature information of the second image forming apparatus by using the received scan image.

The color charts may include a plurality of colors regarding each of achromatic colors, bright colors, skin colors, and color gamut boundary.

The moderating may moderate color converting table of the first image forming apparatus by combining color values of the selected color feature information and color values of the acquired color feature information regarding each of the plurality of color ranges on predetermined ratio.

The moderating may moderate a color converting table of the first image forming apparatus by using color values of the acquired color feature information regarding color ranges included in the acquired color feature information, or by using color values of the selected color feature information regarding color ranges excluded by the acquired color feature information.

Meanwhile, the selecting may include displaying a matching degree with the acquired color feature information regarding each of the plurality of prestored color feature information and receiving a selection on one of the plurality of prestored color feature information.

The foregoing and/or other features and utilities of the present general inventive concept may also be achieved by providing a non-transitory computer-readable recording medium including computer-readable codes to execute a color revising method of a first image forming apparatus is provided, in which the color revising method may include acquiring color feature information of a second image forming apparatus, selecting one from a plurality of prestored color feature information by using the acquired color feature information, and moderating a color converting table of the first image forming apparatus by using the selected color feature information and the acquired color feature information.

The foregoing and/or other features and utilities of the present general inventive concept may also be achieved by providing an image forming apparatus, including a moderator to compare a scanned image from a second image forming apparatus with a plurality of prestored images within the image forming apparatus to moderate a color converting table of the image forming apparatus based on the comparison, and a controller to control the image forming apparatus to perform a printing operation based on the moderated color converting table.

The moderator may select a prestored image from the plurality of prestored images that is most similar to the scanned image to combine color values of the selected prestored image and color values of the scanned image to perform the moderation of the color converting table of the image forming apparatus.

The moderator may perform the comparison by comparing color feature information of at least a portion of the scanned image with color feature information of at least a portion of each of the plurality of prestored images.

The color feature information may include at least one of an achromatic area, a bright area, skin colors, and a color gamut boundary.

The image forming apparatus may further include an acquirer to acquire color feature information corresponding to the scanned image by extracting color values corresponding to a color chart from the scanned image, wherein the moderator compares the acquired color feature information to color feature information corresponding to the prestored images in order to perform the moderation of the color converting table.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
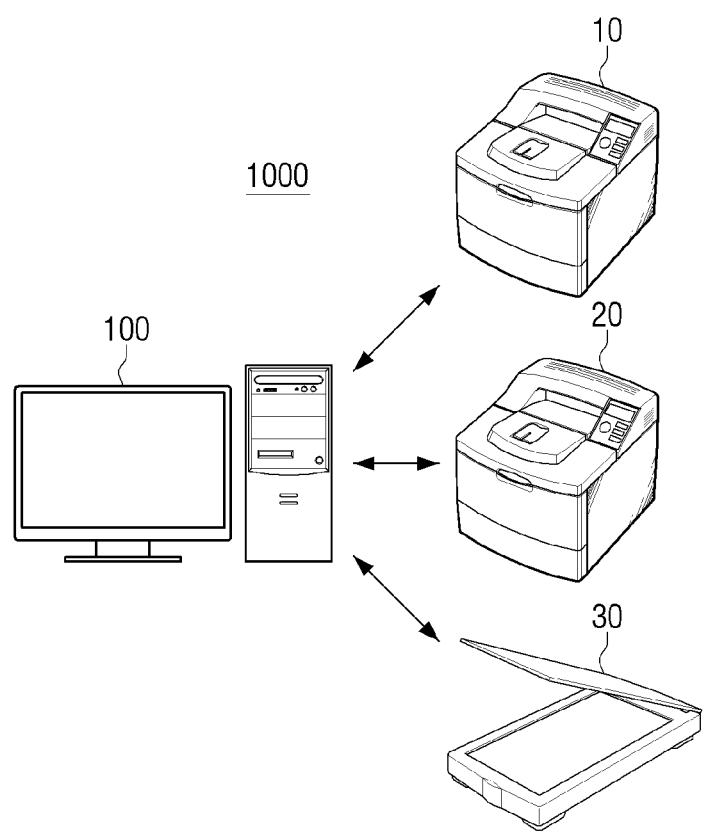
FIG. 1 is a block diagram of an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating an image forming system 1000 according to an exemplary embodiment of the present general inventive concept.

Referring to FIG. 1, the image forming system 1000 according to an exemplary embodiment of the present general inventive concept may include a print controlling apparatus 100, a first image forming apparatus 10, a second image forming apparatus 20, and an image reading apparatus 30.

The print controlling apparatus 100 receives a print command and generates printing data. Specifically, the print controlling apparatus 100 receives a print command corresponding to a document from a user, generates printing data corresponding to the document in response to the input print command, and transmits the generated printing data to the first and second image forming apparatuses 10 and 20. A structure and operations of the print controlling apparatus 100 will be explained below by referring to FIGS. 2 and 3. The print controlling apparatus 100 may be a personal computer (PC), laptop computer, mobile phone, smart phone, portable media player (PMP), MP3 player, etc., but is not limited thereto.

The first and second image forming apparatuses 10 and 20 receive the printing data from the print controlling apparatus 100, and print the received printing data. Specifically, the first and second image forming apparatuses 10 and 20 may receive printing data from the print controlling apparatus 100, and may perform printing jobs regarding the received printing data. The first and second image forming apparatuses 10 and 20 may be copy machines, printers, facsimiles, or multi-function peripherals (MFPs) that may implement the above functions of copying, printing and faxing via a single apparatus.

In the following description, the first image forming apparatus 10 is an operating image forming apparatus that performs color revising, and the second image forming apparatus 20 is an objective image forming apparatus that may receive printing data corresponding to the revised colors from the first image forming apparatus 10 in order to implement the revised colors. Accordingly, the second image forming apparatus 20 may receive scan charts from the print controlling apparatus 100 in order to print the scan charts.

The image reading apparatus 30 scans a document and generates a scan image therefrom. Specifically, the image reading apparatus 30 may read scan charts printed by the second image forming apparatus 20, generate scan image, and transmit the generated scan image to the print controlling apparatus 100. The image reading apparatus 30 may be scanner, digital camera, spectrophotometer, etc., but is not limited thereto.

The exemplary embodiment of the present general inventive concept according to FIG. 1 illustrates and describes that the image forming system 1000 includes the image reading apparatus 30 as a separate apparatus. However, if the first and second image forming apparatuses 10 and 20 are MFPs that can perform a scan function when implemented, the first and second image forming apparatuses 10 and 20 may read scan charts printed by the second image forming apparatus 20 and may thereby generate a scan image.

Further, the above exemplary embodiment of the present general inventive concept according to FIG. 1 illustrates and describes that the print controlling apparatus 100 directly connects to the first and second image forming apparatuses 10 and 20, as well as the image reading apparatus 30. However, the print controlling apparatus 100 may be implemented to indirectly connect to the first and second image forming apparatuses 10 and 20 and the image reading apparatus 30 via a network created by a router and a server. Further, when implemented, each of the above-described apparatuses may be connected to each other wirelessly.

Figure 2:
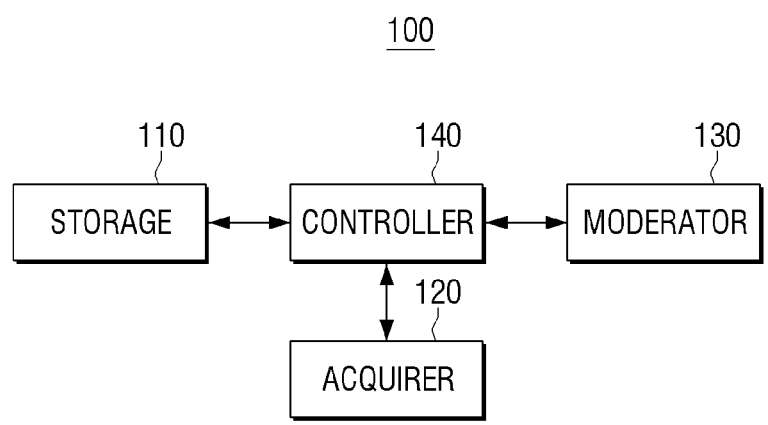
FIG. 2 is a schematic block diagram of a print controlling apparatus according to an exemplary embodiment of the present general inventive concept.

FIG. 2 is a schematic block diagram of a print controlling apparatus according to an exemplary embodiment of the present general inventive concept.

Referring to FIG. 2, a print controlling apparatus 100 may include a storage 110, an acquirer 120, a moderator 130, and a controller 140.

The storage 110 stores a plurality of color feature information or color feature values. Color feature information may include an International Color Consortium (ICC) profile or a color converting table. A plurality of color feature information prestored in the storage 110 may include an ICC profile or the color converting table, which are previously created by manufacturers of various image forming apparatuses on the market, specifically various image forming apparatuses having different manufacturers, product classes, or products.

An ICC profile is a set of data that characterizes a color input or output device, or a color space, according to standards promulgated by the International Color Consortium (ICC). As such, characteristic colors of an original image may be implemented on color input and output devices regardless of color implementing features in the color input and output devices, and various image converting operations may be applied thereto. The ICC profile may correspond to a digital file that defines a relationship between a device-dependent color space and a device-independent color space in a format of mathematical modeling or a look-up table.

The device-dependent color space is a color coordinate that expresses values of digital controlling signals in specific bit number, such as 8 bits or 10 bits, to define colors that are usable by color input and output devices. RGB, CMY and CMYK color spaces are typically used according to a method implementing colors of output devices and a number of primary colors. However, because the device-dependent color space expresses only colors of color input and output devices with combinations of digital controlling signal values, natural colors as originally seen in nature cannot be reproduced. Further, on the device-dependent color space, when an image having uniform values of color coordinates is output in another color output device having different features of color implementing, output image colors are shown differently, having different hues and intensities, for example.

The device-independent color space is a color dimensional coordinate that quantifies and expresses color stimulus values that a human eye may perceive, and can reflect uniform color values regardless of color implementing features in color output devices. Representatively, color coordinates such as sRGB, CIEXYZ, or CIELab are used.

Figure 4:
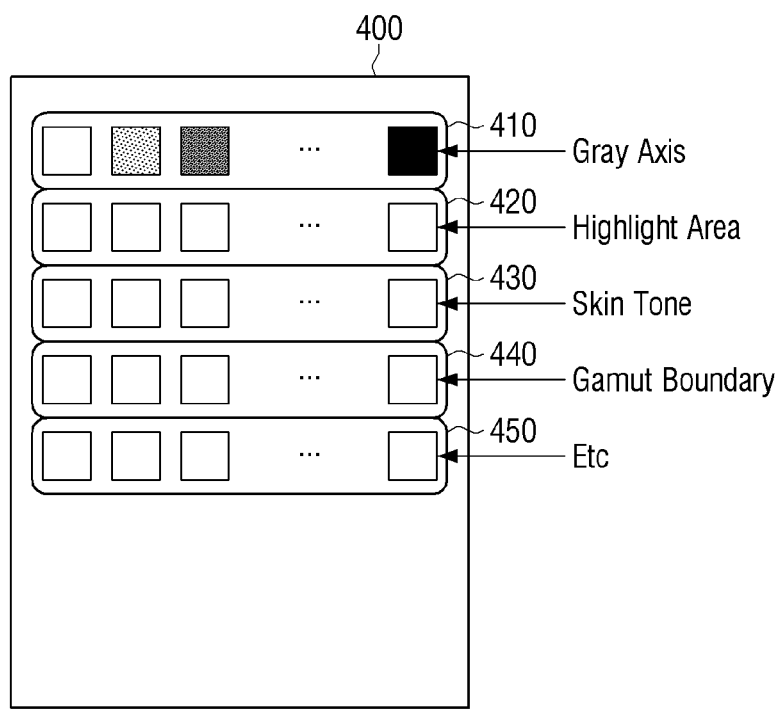
FIG. 4 illustrates an example of color charts according to an exemplary embodiment of the present general inventive concept.

The storage 110 stores an image corresponding to color charts. Color charts are charts including a plurality of colors regarding each of achromatic colors, bright colors, skin colors, and color gamut boundary. An example of color charts is illustrated in FIG. 4. Although the exemplary embodiment of the present general inventive concept describes that color charts of FIG. 4 are used, other types of color charts known to one of ordinary skill in the art may be used.

The storage 110 may be a storage medium within the print controlling apparatus 100 or external storing medium, such as a hard drive, a removable disk including USB memory, or a web server through network.

The acquirer 120 acquires color feature information of the second image forming apparatus 20. Specifically, the acquirer 20 may directly acquire an ICC profile or a color converting table of the second image forming apparatus 20. Further, the acquirer 120 may operate so that the color charts are printed by the second image forming apparatus 20, receive the scan image of the color charts printed by the second image forming apparatus 20, and acquire the color feature information of the second image forming apparatus 20 by utilizing the received scan image.

If color feature information is acquired by utilizing a scan image, the acquirer 120 may extract color values included in color charts from the scanned color charts, and generate RGB three-dimensional color matrix of the scanned color charts by using the extracted color values. As such, the acquirer 120 may generate RGB three-dimensional color matrix from the extracted color values by using regression technology. Regression technology is technology that infers undefined RGB color space by utilizing a plurality of color values. Since regression technology is well-known to one of ordinary skill in the art, detailed explanation thereof is not included herein.

The acquirer 120 may generate an RGB three-dimensional color matrix regarding color feature information stored in the storage 110.

The moderator 130 stores a color converting table of the first image forming apparatus 10. The color converting table is look-up table indicating converting values that can convert colors within an RGB color space to colors within a CMYK color space so as to implement colors within the RGB color space within printing data in an image forming apparatus that uses the CMYK color space. While the exemplary embodiment of the present general inventive concept only describes that color converting table to convert RGB color space to CMYK color space is used, a color converting table to convert color spaces other than the RGB color space to the CMYK color space may also be used. The color converting table of the second image forming apparatus 20 in the storage 110 may be renewed by the moderator 130, which will be explained below. Although the exemplary embodiment of the present general inventive concept describes that the color converting table is stored in the moderator 130, the color converting table may also be stored in the storage 110.

The moderator 130 moderates the color converting table corresponding to the first image forming apparatus 10 by using the acquired color feature information and a plurality of color feature information stored in the storage 110. Specifically, the moderator 130 may select prestored color feature information that is most similar to the acquired color feature information from the plurality of prestored color feature information. Accordingly, the moderator 130 may compare each RGB three-dimensional color matrix of the plurality of prestored color feature information with an RBG three-dimensional color matrix of the acquired color feature information, and calculate similarities between the acquired color feature information regarding each of the plurality of prestored color feature information. The moderator 130 may select prestored color feature information having the highest similarity based on the calculated similarity. During implementation, a display matching degree (i.e., a similarity) with the acquired color feature information regarding each of the plurality of prestored color feature information may be displayed on a user interface window, and a user may select one of the plurality of color feature information.

The moderator 130 may convert the color converting table corresponding to the first image forming apparatus 10 by using the selected color feature information. Specifically, the moderator 130 may convert the color converting table corresponding to the first image forming apparatus 10 by using the selected color feature information and/or the acquired color feature information using the above various methods.

First, the moderator 130 may substitute the color converting table of the selected color feature information with the color converting table of the previous first image forming apparatus 10. Specifically, the moderator 130 may compare the RGB three-dimensional color matrix of the selected color feature information with the RGB three-dimensional color matrix of the color converting table corresponding to the first image forming apparatus 10 by using 3D-interpolation, and may redefine the RGB color mapping features of the first image forming apparatus 10 based on the comparison results so that RGB color values of color converting table corresponding to the first image forming apparatus 10 have color values of the selected color feature information. The moderator 130 may renew the color converting table of the first image forming apparatus 10 by using the redefined RGB color mapping features.

Further, the moderator 130 may moderate the color converting table of the first image forming apparatus 10 by combining color values of the selected prestored color feature information and the color values of the acquired color feature information corresponding to each of a plurality of color ranges at a predetermined ratio. Specifically, the moderator 130 may combine the RGB three-dimensional color matrix of the selected color feature information and the RGB three-dimensional color matrix of the acquired color feature information at a predetermined ratio, specifically, corresponding to a default value or corresponding to a user selected value, compare the combined three-dimensional color matrix with the RGB three-dimensional color converting table of the color converting table corresponding to the first image forming apparatus 10, and redefine the RGB color mapping features of the first image forming apparatus 10 so that RGB color values of the color converting table regarding the first image forming apparatus 10 have color values of the combined RGB three-dimensional color matrix based on the comparison results. The moderator 130 may renew the color converting table of the first image forming apparatus 10 by using the redefined color mapping features.

Further, the moderator 130 may convert the color converting table of the first image forming apparatus 10 by using color values of the acquired color feature information regarding a color range included in the acquired color feature information or by using color values of the selected color feature information regarding a color range excluded in the acquired color feature information. Specifically, the moderator 130 may generate the RGB three-dimensional color matrix by combining color values of the selected color feature information with the acquired color feature information corresponding to the user input ratio or the user setting, compare the generated RGB three-dimensional color matrix with the RGB three-dimensional color converting table of the color converting table corresponding to the first image forming apparatus 10, redefine the RGB color mapping features of the first image forming apparatus 10 so that RGB color values of the color converting table corresponding to the first image forming apparatus 10 have color values of the generated RGB three-dimensional color matrix based on the comparison results, and renew the color converting table of the first image forming apparatus 10 by using the redefined RGB color mapping features.

Although the exemplary embodiment of the present general inventive concept describes that the acquirer 120 and the moderator 130 are separate units, the acquirer 120 and the moderator 130 may be formed within a single unit.

The controller 140 controls each unit within the print controlling apparatus 100. Specifically, if a command to moderate color features is input by a user, the controller 140 controls printing color charts in the second image forming apparatus 20. If the scan image of the printed color charts is received from the second image forming apparatus 20, the controller 140 controls the acquirer 120 to acquire color feature information of the second image forming apparatus 20 by using the received scan image, and controls the moderator 130 to moderate the color converting table corresponding to the first image forming apparatus 10 by using the acquired color feature information and the prestored color feature information.

Further, the controller 140 may perform printing jobs by utilizing the moderated color converting table.

The foregoing illustrates and describes basic components of the print controlling apparatus 100. However, the print controlling apparatus 100 may include components other than those described above. A detailed description of the print controlling apparatus 100 will be explained below by referring to FIG. 3.

Figure 3:
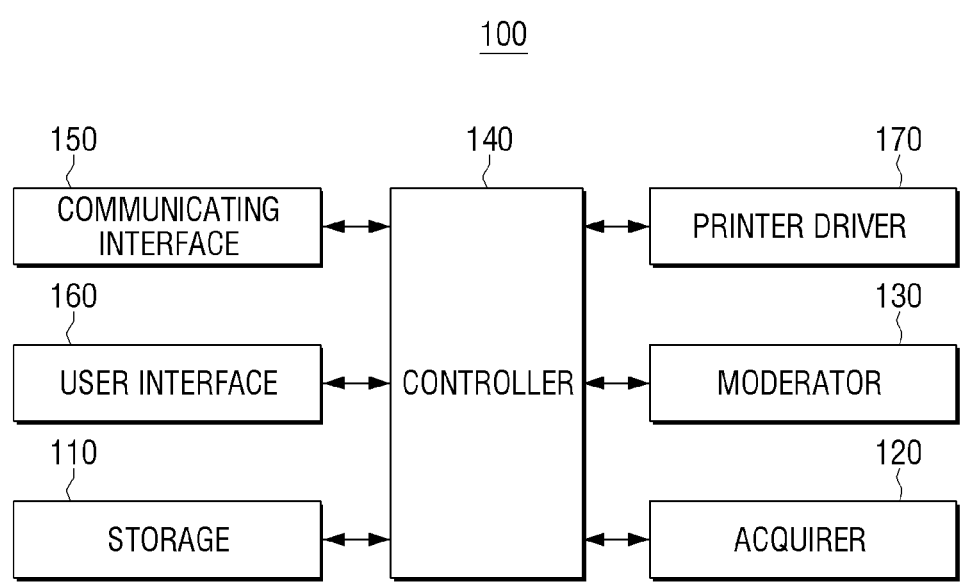
FIG. 3 is a detailed block diagram of a print controlling apparatus according to an exemplary embodiment of the present general inventive concept.

FIG. 3 is a detailed block diagram of a print controlling apparatus according to an exemplary embodiment of the present general inventive concept.

Referring to FIG. 3, a print controlling apparatus 100 according to an exemplary embodiment of the present general inventive concept may include a storage 110, an acquirer 120, a moderator 130, a controller 140, a communicating interface 150, a user interface 160, and a printer driver 170.

Because operations of the storage 110, the acquirer 120 and the moderator 130 can be uniformly explained as in described by referring to FIG. 2, overlapping explanations will not be included herein.

The communicating interface 150 is connected to the first and second image forming apparatuses 10 and 20 and transmits printing data to the first and second image forming apparatuses 10 and 20. Specifically, the communicating interface 150 is formed to connect the print controlling apparatus 100 with external devices. Installation may be implemented by connecting to the first and second image forming apparatuses 10 and 20 through a universal serial bus (USB) port as well as a local area network and Internet network.

The communicating interface 150 may transmit image corresponding to color charts (or printing data corresponding to color charts) to the second image forming apparatus 20. Although the exemplary embodiment of the present general inventive concept only describes that color charts are transmitted to the second image forming apparatus 20 through the communicating interface 150, an image corresponding to the color charts may be delivered by utilizing a portable-type storing medium (e.g., USB storing medium, external hard drive, etc.).

The communicating interface 150 receives a scan image from the image reading apparatus 30. Specifically, the communicating interface 150 may receive the scan image corresponding to the color charts printed by the second image forming apparatus 20 from the image reading apparatus 30. If the first image forming apparatus 10 and the second image forming apparatus 20 are MFPs that can perform a scan function when implemented, a scan image corresponding to the printed color charts may be received from the first image forming apparatus 10 or the second image forming apparatus 20.

The communicating interface 150 may transmit printing data generated in a driver 170, which will be explained below, to the first and second image forming apparatuses 10 and 20.

The user interface (UI) 160 includes a plurality of function keys that a user may predefine, or the user may select various types of functions supported by the print controlling apparatus 100. The UI 160 also displays various types of information provided from the print controlling apparatus 100. The user interface 160 may be implemented as a device that simultaneously performs input and output functions, such as touch screen, or may alternatively be a device combined with a mouse and a monitor. A user may input a command to moderate color features via a user interface window provided by the user interface 160 so as to acquire an output from the second image forming apparatus 20.

The printer driver 170 supports an interface between the print controlling apparatus 100 and the first and second image forming apparatuses 10 and 20, and converts data that a user tries to print into printing data, using a language format that the first and second image forming apparatuses 10 and 20 understand.

The printer driver 170 may generate printing data by using the renewed color converting table.

The controller 140 controls each unit within the print controlling apparatus 100. Specifically, if a command to moderate color features is input through the user interface 160, the controller 140 controls the printer driver 170 to print color charts in the second image forming apparatus 20. If the scan image of the color charts printed by the second image forming apparatus 20 is received through the communicating interface 150, the controller 140 controls the acquirer 120 to acquire color feature information of the second image forming apparatus 20 by using the received scan image, and controls the moderator 130 to moderate the color converting table of the first image forming apparatus 10 by using the acquired color feature information and the prestored color feature information.

As described above, the print controlling apparatus 100 according to FIG. 3 uses prestored color feature information while implementing color features of another image forming apparatus. Thus, data may be output in colors that are more accurate.

FIG. 4 illustrates an example of color charts according to an exemplary embodiment of the present general inventive concept.

Referring to FIG. 4, color charts 400 include a first area 410 indicating achromatic colors, a second area 420 indicating bright colors, a third area 430 indicating skin colors, a fourth area 440 indicating a color gamut boundary and a fifth area 450 indicating extra colors.

In the exemplary embodiment of the present general inventive concept, color feature information to be acquired from the second image forming apparatus 20 is provided to view color features within a main color implementing range, rather than to view overall color features of the second image forming apparatus 20. As such, an objective of acquiring color feature information from the second image forming apparatus 20 is to acquire necessary information to substantiate differences between color features of an achromatic area, a bright area, skin colors, and a color gamut boundary, which have large differences in color features of image forming apparatuses. Therefore, the color charts according to an exemplary embodiment of the present general inventive concept include color values regarding areas having large differences in color features.

Figure 5:
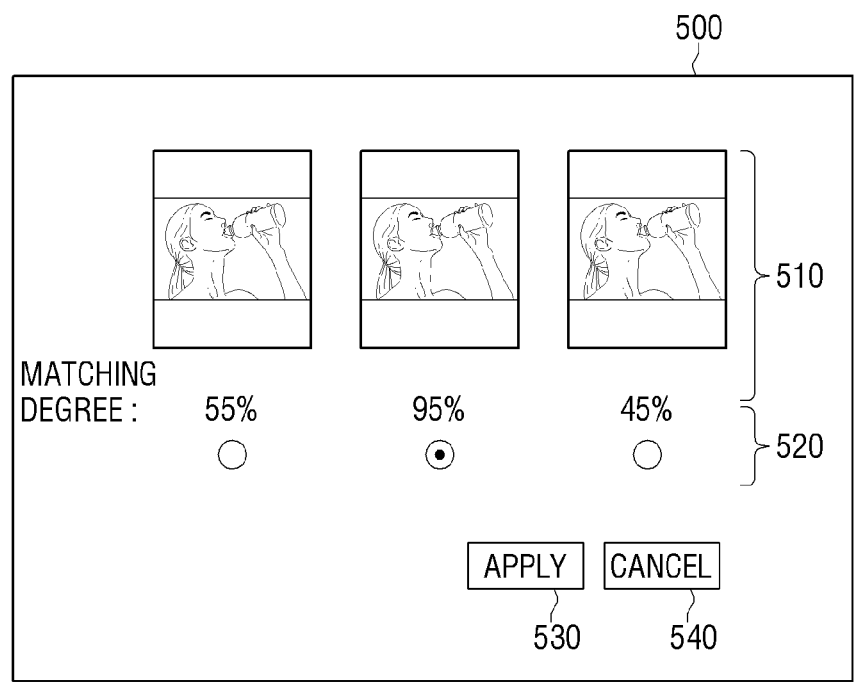
FIGS. 5 and 6 illustrate various examples of user interface window that can be displayed on a user interface of FIG. 3.
Figure 6:
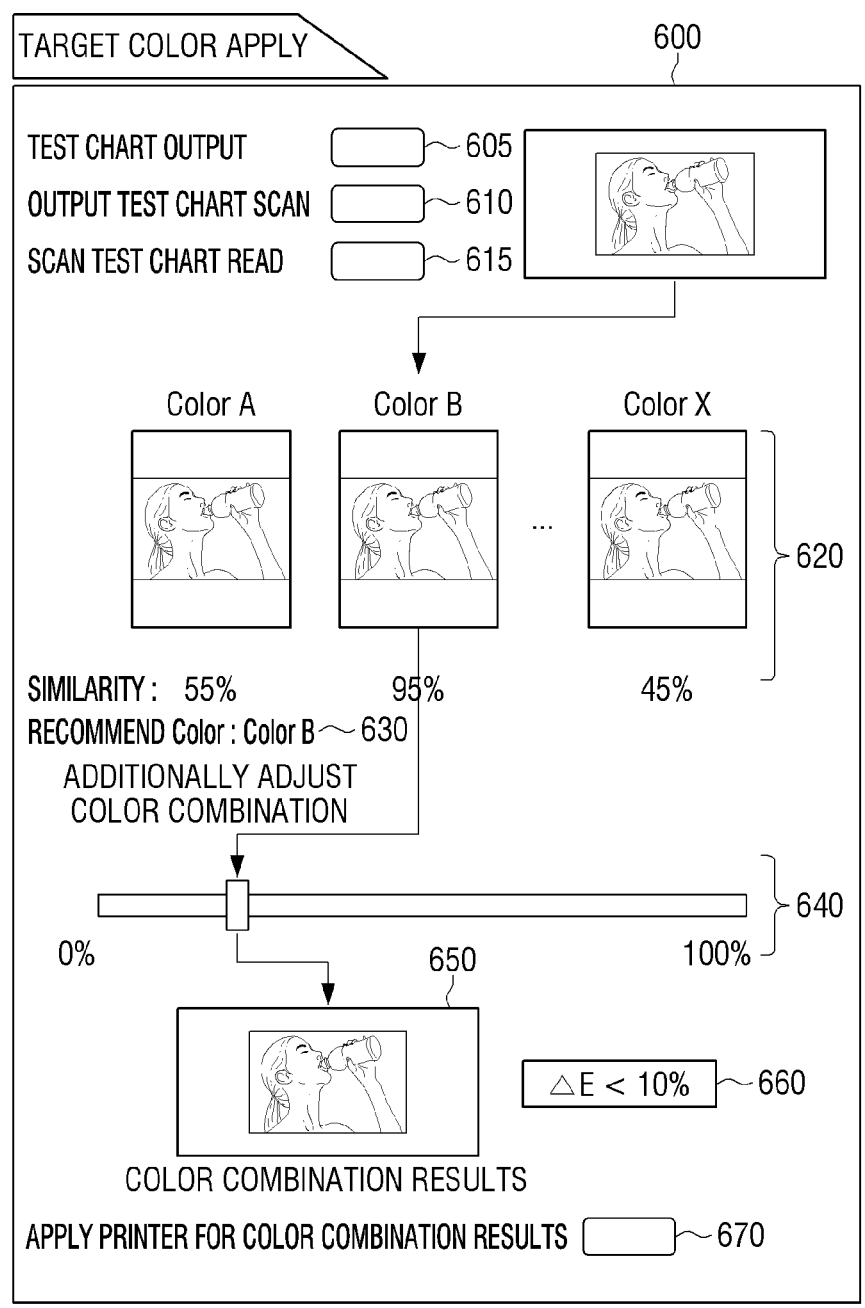

FIGS. 5 and 6 illustrate various examples of a user interface window that can be displayed on a user interface.

Referring to FIG. 5, user interface window 500 includes a first area 510, a second area 520, an apply area 530, and a cancel area 540.

The first area 510 is area that displays an image with reference to matching degrees of acquired color feature information corresponding to each of a plurality of stored color feature information. Specifically, the first area 510 is area that displays an image with regard to the colors moderated by the moderator 130, as described above.

The second area 520 is area where one of a plurality of color feature information may selected by a user. The color feature information may be represented by radio buttons denoting a particular color percentage.

The apply area 530 is area where a command to perform color revising may be input by using the color feature information selected in the second area 520.

The cancel area 540 is area where a user command to cancel an operation of color revising may be input.

FIG. 5 illustrates an example in which a predetermined percentage corresponding to color feature information to be applied is selected through a user interface window. However, a user may select combination degrees between the selected color feature information and the acquired color feature information via a different type of user interface window, as illustrated in FIG. 6.

Referring to FIG. 6, a user interface window 600 includes a print output area 605, a scan area 610, a compare area 615, a similarity display area 620, a similarity result area 630, an adjust area 640, a preview area 650, a color difference display area 660 and an apply area 670.

The print output area 605 is an area where a command to output color charts via the second image forming apparatus 20 is input. If the print output area 605 is selected, the print controlling apparatus 100 may transmit a prestored color chart image (or color chart printing data) to the second image forming apparatus 20.

The scan area 610 is an area where a command to scan the printed color charts is input. If the scan area 610 is selected, the print controlling apparatus 100 may control the image reading apparatus 30 so that the color charts printed by the second image forming apparatus 20 can be scanned.

The compare area 615 is an area where a command is received to perform a calculation of a similarity of the plurality of prestored color feature information and color feature information acquired from the scan image by using the scanned color charts. If the compare area 615 is selected, the print controlling apparatus 100 may determine similarity between each of the plurality of prestored color feature information and the acquired colors, and display determining results on the similarity display area 620 and the similarity result area 630 of the user interface window 600.

The similarity display area 620 is an area where a similarity between each of the plurality of prestored color feature information and the acquired color feature information is displayed. The similarities may be represented by a percentage denoting an amount of similarity between the each of the plurality of prestored color feature information and the acquired color feature information. For example, FIG. 6 illustrates that a Color B of the prestored color feature information has a 95% similarity to the acquired color feature information, while color A of the prestored color feature information has a 55% similarity to the acquired color feature. As such, the Color B of the prestored color feature information has a closer similarity to the acquired color feature information than the Color A.

The similarity result area 630 is an area where prestored color feature information having the highest (i.e., closest) similarity is displayed according to similarity results. As illustrated in FIG. 6, the Color B of the prestored color feature information has a closest similarity to the acquired color feature information.

The adjust area 640 is an area where a ratio of combining the selected color feature information and the acquired color feature information may be selected. The adjust area 640 may be implemented in a slide bar format as illustrated in FIG. 6, or in a format which directly receives a combination ratio as input by a user.

The preview area 650 is an area where a preview image corresponding to the color converting table generated according to the combination ratio selected in the adjust area 640 is displayed.

The color difference display area 660 is an area where a difference between color feature information acquired according to the combination ratio selected in the adjust area 640 and the color feature information according to the combination results is displayed.

The adjust area 670 is an area where a command to perform color revising according to the combination ratio selected in the adjust area 640 may be input.

The above describes that color converting table of the first image forming apparatus 10 may be stored and moderated in the print controlling apparatus 100, However, if the color converting table is stored in the image forming apparatus 10, the print controlling apparatus 100 may renew the color converting table and transmit the renewed color converting table to the first image forming apparatus 10. Further, the first image forming apparatus 10 can renew color converting table within itself. Such an exemplary embodiment of the present general inventive concept will be explained below by referring to FIG. 7.

Figure 7:
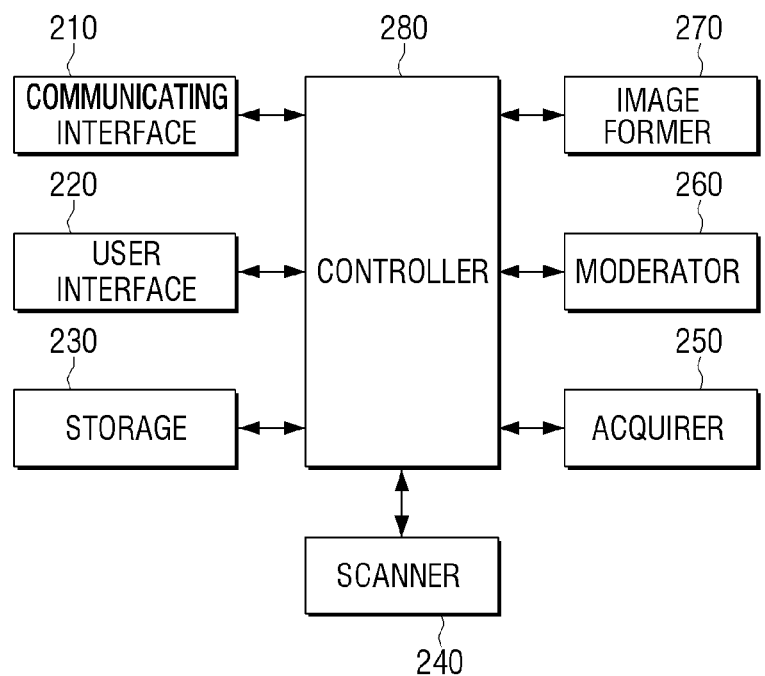
FIG. 7 is a block diagram of an image forming apparatus according to an exemplary embodiment of the present general inventive concept.

FIG. 7 is a block diagram of an image forming apparatus 200 according to an exemplary embodiment of the present general inventive concept.

The image forming apparatus 200 includes a communicating interface 210, a user interface 220, a storage 230, a scanner 240, an acquirer 250, a moderator 260, an image former 270 and a controller 280.

The communicating interface 210 connects to the print controlling apparatus 100 and receives printing data from the print controlling apparatus 100. Specifically, the communicating interface 210 is formed to connect to the print controlling apparatus 100 with external devices. Connecting to the print controlling apparatus 100 can be performed through USB port as well as LAN or Internet network. The print controlling apparatus 100 connected to the image forming apparatus 200 may be the print controlling apparatus 100 illustrated in FIGS. 2 and 3, or general print controlling apparatus 100 that does not include functions of FIGS. 2 and 3.

The communicating interface 210 may transmit an image corresponding to color charts to the print controlling apparatus 100 or to the second image forming apparatus 20. Color charts are charts including a plurality of colors regarding each of a plurality of achromatic colors, bright colors, skin colors, and a color gamut boundary. An example of color charts is illustrated in FIG. 4. Although the exemplary embodiment of the present general inventive concept only describes that color charts of FIG. 4 are used, the above-described color charts may be combined with color charts known to one of ordinary skill in the art.

Although the exemplary embodiment of the present general inventive concept describes the transmitting to the print controlling apparatus 100 or the second image forming apparatus 20 through the communicating interface 210, a carrying-type storing medium such as USB storing medium may be used to transmit the image corresponding to the color charts.

The user interface 220 includes a plurality of function keys that a user can establish or select various types of functions supported by the image forming apparatus 200, and displays various types of information provided by the image forming apparatus 200. The user interface 220 may be implemented as a device that simultaneously performs an input and output, such as touch screen, or may be a device combining a mouse and a monitor. A user may input a command to begin color revising of the image forming apparatus 200 via a user interface window provided by the user interface 220.

The storage 230 stores printing data. Specifically, the storage 230 may store printing data received from the above communicating interface 210. The storage 230 may be implemented as an external storing medium, such as a removable disk including USB memory, an external hard drive, and web server through a network, as well as an internal storing medium within the image forming apparatus 200.

The storage 230 stores a plurality of color feature information. The color feature information may include an ICC profile or a color converting table and a plurality of color feature information prestored in the storage 230 may be an ICC profile or a color converting table that are previously created by manufacturers of various image forming apparatuses on the market, specifically various image forming apparatuses having different manufacturers, product classes, or products.

The storage 230 stores the color converting table. The color converting table is a look-up table indicating converting values that can convert colors within an RGB color space to colors on a CMYK color space, so as to implement colors within the RGB color space within printing data in an image forming apparatus that uses the CMYK color space. Such a color converting table may be renewed by the moderator 260, which will be described below. The exemplary embodiment of the present general inventive concept only describes that the color converting table to convert the RGB color space to the CMYK color space is used. However, the color converting table may be used to convert other color spaces besides the RGB color space to CMYK color space.

The storage 230 stores an image corresponding to color charts.

The scanner 240 includes a lens forming lights reflecting from a document to an image on an internal image sensor, and reads image information of the document from the lights formed on the image sensor. The scanner 240 scans the color charts printed by the second image forming apparatus 20, and provides the scanned color charts to the acquirer 250. As such, the scanner 240 may provide the image corresponding to the scanned color charts to the acquirer 250, or extract only color values included in the scanned color charts, and provide the color values to the acquirer 250. Meanwhile, the scanner 240 may be mounted on a flatbed scanner system or within a Duplex Automatic Document Feeder (DADF).

The scanner 240 may convert at least one of color space, number, and color arrangement of the scanned color charts. Specifically, if the color charts scanned by the scanner 240 are not charts illustrated in FIG. 4, the scanner 240 may convert the scanned color charts to be suitable to provide a color arrangement of the charts illustrated in FIG. 4, while keeping color values of the scanned color charts. The scanner 240 may provide the converted color charts to the acquirer 250.

Although the exemplary embodiment of the present general inventive concept only describes that color charts are directly scanned and used by the scanner 240 mounted within the image forming apparatus 200, color charts may be scanned through external scan devices and the color charts scanned by external scan devices may be received by using the communicating interface 210.

The acquirer 250 acquires color feature information of the second image forming apparatus 20. Specifically, the acquirer 250 may directly acquire ICC profile or color converting table of the second image forming apparatus 20. Further, the acquirer 250 may operate so that color charts are printed by the second image forming apparatus 20, receive the scan image of the color charts printed by the second image forming apparatus 20, and acquire the color feature information of the second image forming apparatus 20 by using the received scan image.

If the color feature information is acquired by using the scan image, the acquirer 250 may extract color values included in the color charts from the scanned color charts, and generate an RGB three-dimensional color matrix of the scanned color charts by using the extracted color values. The acquirer 250 may generate the RGB three-dimensional color matrix from the extracted color values by using regression technology.

The acquirer 250 may generate RGB three-dimensional color matrix regarding color feature information stored in the storage 230.

The moderator 260 converts a color converting table regarding the image forming apparatus 200 by using the acquired color feature information and the plurality of color feature information stored in the storage 230. Specifically, the moderator 260 may select prestored color feature information among the plurality of prestored color feature information compared that is most similar to the acquired color feature information. More specifically, the moderator 260 may compare each of the RGB three-dimensional color matrices regarding the plurality of prestored image forming apparatus with the RGB three-dimensional color matrix of the acquired color feature information, and calculate similarities between the acquired color feature information with respect to each of the plurality of prestored color feature information.

The moderator 260 may select prestored color feature information having the highest similarity based on the calculated similarity. Furthermore, matching degrees (i.e., similarities) between the acquired color feature information with respect to each of the plurality of color feature information may be displayed on the user interface window, such that one of the plurality of color feature information may be selected from a user.

The moderator 260 may convert the color converting table by using the selected color feature information. Specifically, the moderator 260 may convert the color feature table by using the selected color feature information and/or the acquired color feature information with various methods as described above.

The moderator 260 may substitute the color converting table of the selected color feature information with color converting table regarding the previous image forming apparatus 200. The moderator 260 may also convert the color converting table of the image forming apparatus 200 by combining color values of the selected color feature information and color values of the acquired color feature information regarding each of a plurality of color ranges with respect to a predetermined ratio. Further, the moderator 260 may convert the color converting table of the image forming apparatus 200 by using color values of the acquired color feature information regarding color range included in the acquired color feature information or color values of the selected color feature information regarding color ranges excluded in the acquired color feature information.

Although the exemplary embodiment of the present general inventive concept describes that the acquirer 250 and the moderator 260 are separate components, a single device including the acquirer 250 and the moderator 260 may be implemented.

The image former 270 prints printing data. Specifically, the image former 270 may print printing data received through the communicating interface 210 by using the renewed color converting table.

The controller 280 controls each component within the image forming apparatus 200. Specifically, if the user interface 220 receives a command to moderate color features from a user, the controller 280 may control the communicating interface 210 to print color charts in the second image forming apparatus 20, and control the scanner 240 to scan the color charts printed by the second image forming apparatus 20.

The controller 280 may control the acquirer 250 to acquire color feature information of the second image forming apparatus 20 by using the received scan image, and control the moderator 260 to moderate the color converting table by using the acquired color feature information and prestored color feature information.

The controller 280 may control the image former 270 to perform printing jobs by using the moderated color converting table.

As described above, the image forming apparatus 200 according to an exemplary embodiment of the present general inventive concept uses prestored color feature information while implementing color features of another image forming apparatus, and thus, implements colors that are more accurate.

Figure 8:
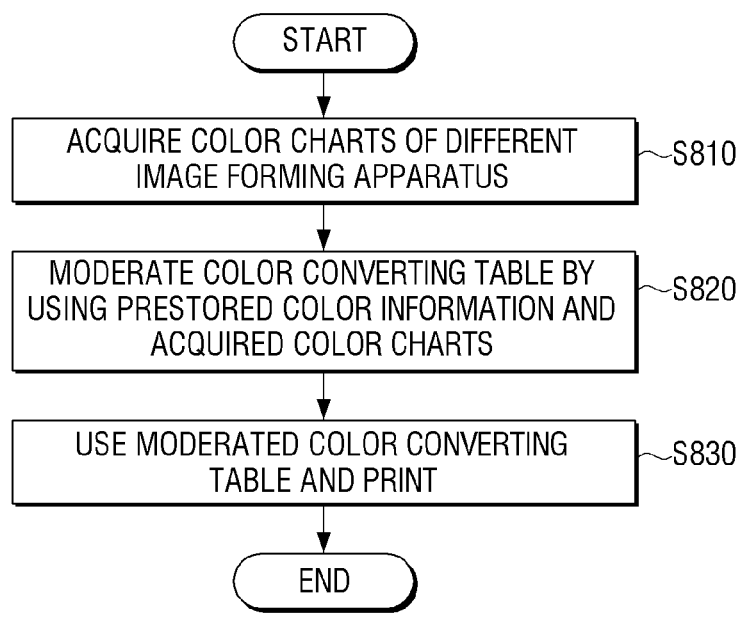
FIG. 8 is a flowchart briefly explaining a color revising method according to an exemplary embodiment of the present general inventive concept.

FIG. 8 is a flowchart briefly explaining a color revising method according to an exemplary embodiment of the present general inventive concept.

Color feature information of the second image forming apparatus 20 is acquired at S810. Specifically, an ICC profile or a color converting table of the second image forming apparatus 20 may be directly acquired, or, color charts may be printed by the image forming apparatus 20, a scan image of the color charts printed by the second image forming apparatus 20 may be received, and color feature information of the second image forming apparatus 20 may be acquired by using the received scan image.

One prestored color feature information is selected from a plurality of prestored color feature information by using the acquired color feature information, and a color converting table regarding the first image forming apparatus is moderated by using the selected color feature information and the acquired color feature information at S820. A detailed operation of moderating the color converting table will be explained below by referring to FIG. 9.

Printing is performed by using the moderated color converting table at S830.

Therefore, the color revising method according to an exemplary embodiment of the present general inventive concept uses prestored color feature information while implementing color features of another image forming apparatus, and thus, implements colors that are more accurate. The color revising method of FIG. 8 may be implemented in a print controlling apparatus as illustrated in FIG. 2 or FIG. 3, an image forming apparatus as illustrated in FIG. 7, or a print controlling apparatus or an image forming apparatus having other embodiments not limited hereto.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Figure 9:
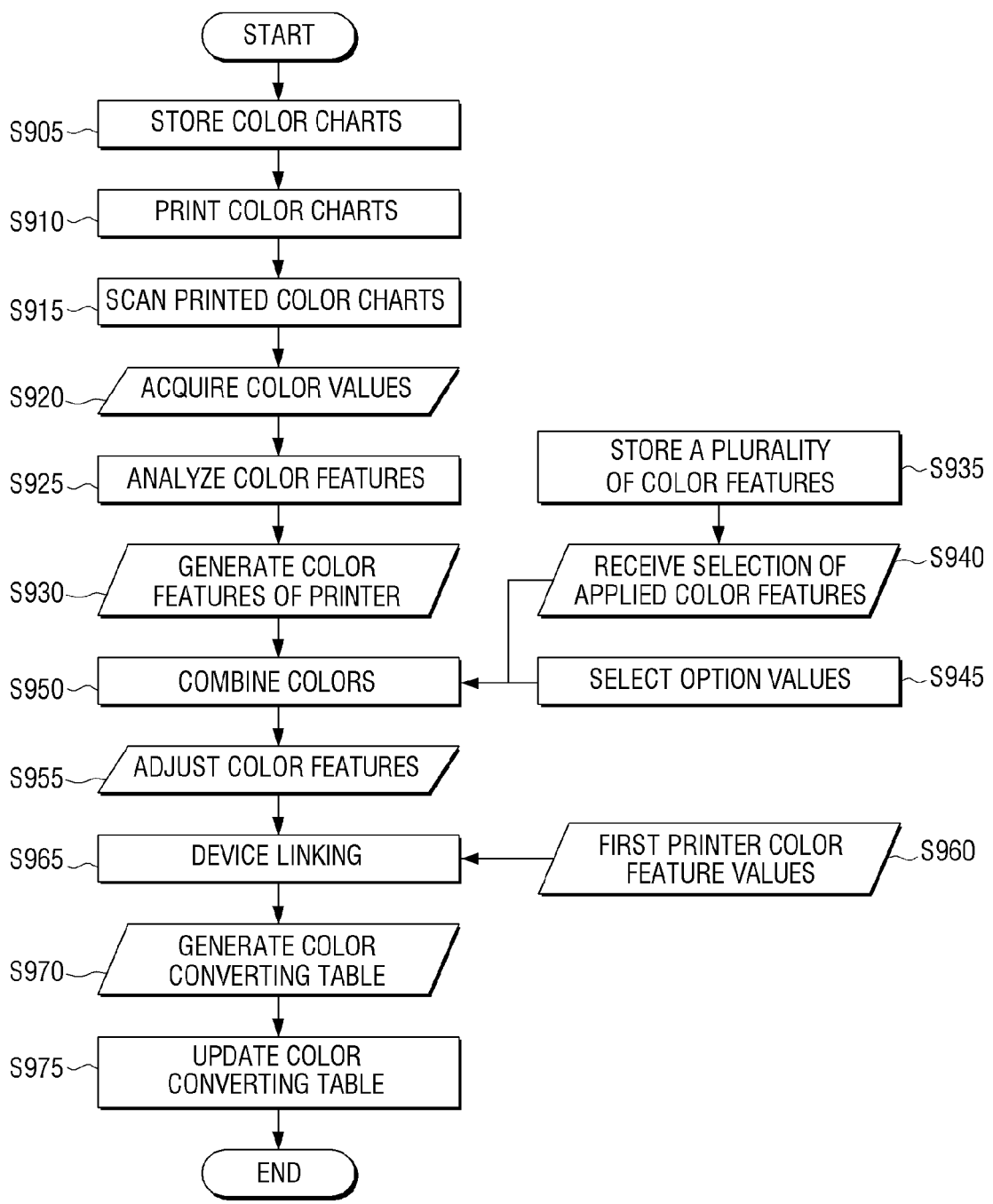
FIG. 9 is a flowchart specifically explaining a color revising method according to an exemplary embodiment of the present general inventive concept.

FIG. 9 is a flowchart specifically explaining a color revising method according to an exemplary embodiment of the present general inventive concept.

The second image forming apparatus 20 previously stores image of color charts to acquire color information at S905.

The prestored color charts are printed by the second image forming apparatus 20 at S910. Specifically, image corresponding to the prestored color charts (or printing data) is transmitted to the second image forming apparatus 20.

At S915, color charts printed by the second image forming apparatus 20 are scanned. The scanning of color charts may be performed in the separate image reading apparatus 30, the first image forming apparatus 10 including a scan function, or the second image forming apparatus 20.

At S920, the scan image is received.

By using the received scan image, color values of color charts are extracted at S925, and color feature information of the second image forming apparatus 20 is acquired based on the extracted color values at S930.

At S940, color feature information to be applied is selected among the color feature information prestored at S935 regarding different image forming apparatuses. Such selecting may be performed automatically according to color similarity or by a user.

At S945, option values of the selected color feature information and the acquired color feature information are selected. Specifically, a combination ratio may be selected via the slide bar within the adjust area 640, as illustrated in FIG. 6.

Color combination is performed based on the selected color feature information, the acquired color feature information and the selected option values at S955. An RGB three-dimensional color matrix to be applied in the first image forming apparatus 10 is generated. Detailed operation of the color combination will be explained below by referring to FIG. 10.

The color feature information at S960 of the first image forming apparatus 10 and the previously generated RGB three-dimensional color matrix are device-linked at S965, and the color converting table regarding the first image forming apparatus 10 is generated at S970.

At S975, the previous color converting table is renewed by using the generated color converting table.

Therefore, the color revising method according to an exemplary embodiment of the present general inventive concept uses prestored color feature information while implementing color features of another image forming apparatus, and thus, implements colors that are more accurate.

Figure 10:
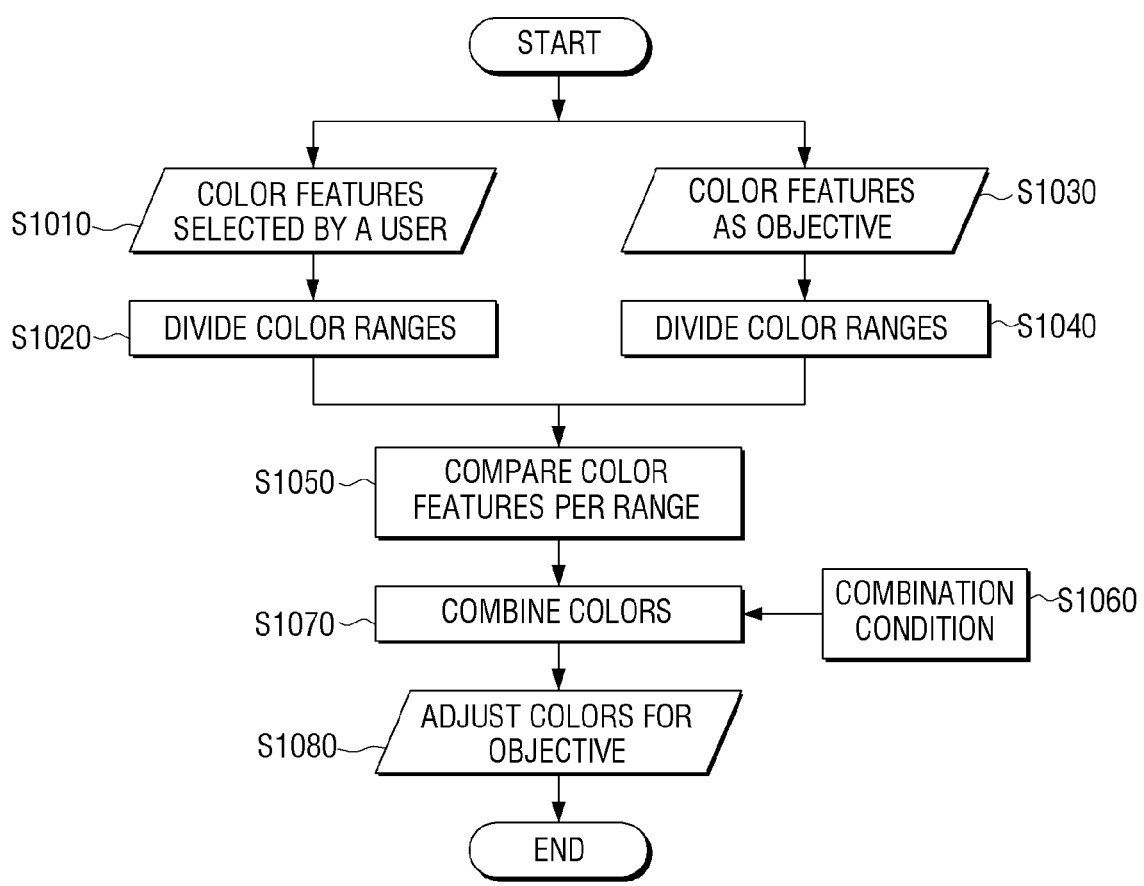
FIG. 10 is a flowchart specifically explaining a color combining operation of FIG. 9.

FIG. 10 is a flowchart specifically explaining the color combining operation of FIG. 9.

Specifically, the color combining operation is an operation to combine color features of an image forming apparatus to be pursued as objective and selected color features before producing color features to be applied in the first image forming apparatus 10, so as to implement colors that a user wants.

Color features of an image forming apparatus to be pursued as objective basically show color features that a user wants to implement, and selected color features show representative color features of a manufacturer (e.g., a manufacturer of the second image forming apparatus 20) regarding color features that a user wants to implement. Thus, such a combination contributes to an enhanced performance of implementing colors that a user wants.

Selected color features are produced by considering color policies of manufacturers, which supplements parts that cannot be considered or may be insufficient in color features as objective.

Color combination is not a simple combination of color features versus color features. Based on color features as objective, selected color features are compared with color features as objective, and an area having large differences in color and an area having small differences in color are divided. Thus, a user can adjust a degree of color combination. This is to supplement color features of the second image forming apparatus 20 by utilizing prestored color features. By supplementing color features, color features or policies of manufacturers or product classes that prestored color features include therein, may be reflected.

Therefore, color features selected by a user at S1010 are divided per color range at S1020, and color features as objective at S1030 are divided per color range at S1040.

Each of the color features divided per range are compared at S1050, and according to a combination condition in each color range selected by a user at S1060, the color combination is performed at S1070. Adjusted objective color features are acquired at S1080.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A print controlling apparatus connectable to a first image forming apparatus, the print controlling apparatus comprising:
    a storage to prestore a plurality of color feature information;
    an acquirer to acquire color feature information of a second image forming apparatus;
    a moderator to moderate a color converting table of the first image forming apparatus by using the acquired color feature information and a stored color feature information from among the plurality of color feature information prestored in the storage; and
    a controller to perform printing jobs regarding the first image forming apparatus by using the moderated color converting table,
    wherein the moderator selects the stored color feature information from among the plurality of prestored color feature information which is most similar to the acquired color feature information by comparing three-dimensional color matrices of the plurality of prestored color feature information with a three-dimensional color matrix of the acquired color feature information.

2. The print controlling apparatus of claim 1, wherein the plurality of stored color feature information include an International Color Consortium (ICC) profile or a color converting table regarding each of the first and second image forming apparatuses, which are different from one another.

3. The print controlling apparatus of claim 2, wherein the first and second image forming apparatuses have at least one difference in manufacturers, product class, and products.

4. The print controlling apparatus of claim 1, further comprising:
    a communicating interface to communicate with a scanner and the second image forming apparatus,
    wherein the acquirer controls the communicating interface to print prestored color charts in the second image forming apparatus, and acquires the color feature information of the second image forming apparatus by using the received scan image, if the scan image corresponding to scanned charts printed by the second image forming apparatus is received through the communicating interface.

5. The print controlling apparatus of claim 4, wherein the color charts include a plurality of colors regarding each of achromatic colors, bright colors, skin colors, and color gamut boundary.

6. The print controlling apparatus of claim 1, wherein the moderator moderates the color converting table of the first image forming apparatus by combining color values of the selected color feature information and color values of the acquired color feature information regarding each of color ranges corresponding to a predetermined ratio.

7. The print controlling apparatus of claim 1, wherein the moderator moderates the color converting table of the first image forming apparatus by using color values of the acquired color feature information regarding color ranges included in the acquired color feature information or by using color values of the selected color feature information regarding color ranges excluded in the acquired color feature information.

8. The print controlling apparatus of claim 1, further comprising:
    a user interface to display a user interface window including a first area to display a matching degree as compared to the acquired color feature information regarding each of the plurality of prestored color feature information and a second area to receive a selection on one of the plurality of prestored color feature information,
    wherein the moderator moderates the color converting table of the first image forming apparatus by using the selected color feature information on the second area and the acquired color feature information.

9. The print controlling apparatus of claim 1, further comprising:
    a user interface to display a user interface window including:
        a first area to display a calculated similarity between the acquired color feature information and at least a portion of the plurality of color feature information prestored in the storage plurality of the degree as compared to the acquired color feature information regarding each of the plurality of prestored color feature information, and
        a second area to separately display the calculated similarity for the stored color feature information from among the plurality of prestored color feature information which is most similar to the acquired color feature information.

10. The print controlling apparatus of claim 9, wherein the user interface window further includes:
    a third area to display a user adjustable control to select an amount for the selected color feature information to be combined with the acquired color feature information, wherein the moderator generates the color converting table of the first image forming apparatus according to the selected amount, and
    a fourth area to display a preview image corresponding to the moderated color converting table of the first image forming apparatus generated according to the selected amount.

11. An image forming apparatus, comprising:
    a storage to prestore a plurality of color feature information and a color converting table;
    a communicating interface to transmit color charts to a different image forming apparatus;
    a scanner to scan color charts printed by the different image forming apparatus;
    a moderator to moderate the color converting table by using the scanned color charts and a stored color feature information from among the prestored plurality of color feature information; and
    an image former to perform printing jobs by using the moderated color converting table,
    wherein the moderator selects the stored color feature information from among the plurality of prestored color feature information which is most similar to color feature information obtained from the scanned color charts by comparing three-dimensional color matrices of the plurality of prestored color feature information with a three-dimensional color matrix generated from the color feature information obtained from the scanned color charts.

12. The image forming apparatus of claim 11, wherein the plurality of stored color feature information include an International Color Consortium (ICC) profile or a color converting table regarding each of the image forming apparatus and the different image forming apparatus.

13. A color revising method of a first image forming apparatus in a print controlling apparatus, the color revising method comprising:
    acquiring color feature information of a second image forming apparatus;
    selecting a stored color feature information from a plurality of prestored color feature information by using the acquired color feature information; and
    moderating, using a controller, a color converting table of the first image forming apparatus by using the selected color feature information and the acquired color feature information,
    wherein the selecting comprises selecting the stored color feature information from among the plurality of prestored color feature information which is most similar to the acquired color feature information by comparing three-dimensional color matrices of the plurality of prestored color feature information with a three-dimensional color matrix of the acquired color feature information.

14. The color revising method of claim 13, wherein the plurality of prestored color feature information include an International Color Consortium (ICC) profile or a color converting table regarding each of the first and second image forming apparatuses, which are different from one another.

15. The color revising method of claim 14, wherein the first and second image forming apparatuses have at least one difference in manufacturers, product class, and products.

16. The color revising method of claim 13, further comprising:
    transmitting prestored color charts to the second image forming apparatus; and
    receiving a scan image regarding scanned charts printed by the second image forming apparatus,
    wherein the acquiring acquires color feature information of the second image forming apparatus by using the received scan image.

17. The color revising method of claim 16, wherein the color charts include a plurality of colors regarding each of achromatic colors, bright colors, skin colors, and color gamut boundary.

18. The color revising method of claim 13, wherein the moderating moderates a color converting table of the first image forming apparatus by combining color values of the selected color feature information and color values of the acquired color feature information regarding each of a plurality of color ranges corresponding to a predetermined ratio.

19. The color revising method of claim 13, wherein the moderating moderates a color converting table of the first image forming apparatus by using color values of the acquired color feature information regarding color ranges included in the acquired color feature information, or by using color values of the selected color feature information regarding color ranges excluded by the acquired color feature information.

20. The color revising method of claim 13, wherein the selecting further comprises:
    displaying a matching degree with the acquired color feature information regarding each of the plurality of prestored color feature information; and
    receiving a selection on one of the plurality of prestored color feature information.

21. A non-transitory computer-readable recording medium including computer-readable codes to execute a color revising method of a first image forming apparatus, wherein the color revising method comprises:
    acquiring color feature information of a second image forming apparatus;
    selecting a stored color feature information from a plurality of prestored color feature information by using the acquired color feature information; and
    moderating, using a controller, a color converting table of the first image forming apparatus by using the selected color feature information and the acquired color feature information,
    wherein the selecting comprises selecting the stored color feature information from among the plurality of prestored color feature information which is most similar to the acquired color feature information by comparing three-dimensional color matrices of the plurality of prestored color feature information with a three-dimensional color matrix of the acquired color feature information.

22. An image forming apparatus, comprising:
    a moderator to compare a scanned image from a second image forming apparatus with a plurality of prestored images within the image forming apparatus to moderate a color converting table of the image forming apparatus based on the comparison; and
    a controller to control the image forming apparatus to perform a printing operation based on the moderated color converting table, wherein the moderator selects a prestored image from the plurality of prestored images that is most similar to the scanned image by comparing three-dimensional color matrices of the plurality of prestored images with a three-dimensional color matrix generated from color feature information obtained from the scanned image.

23. The image forming apparatus of claim 22, wherein combines color values of the selected prestored image and color values of the scanned image to perform the moderation of the color converting table of the image forming apparatus.

24. The image forming apparatus claim 22, wherein the color feature information includes at least one of an achromatic area, a bright area, skin colors, and a color gamut boundary.

25. The image forming apparatus of claim 22, further comprising:
> an acquirer to acquire the color feature information corresponding to the scanned image by extracting color values corresponding to a color chart from the scanned image.

* * * * *

UNITED STATES PATENT AND TRADEMARK OFFICE
CERTIFICATE OF CORRECTION

PATENT NO. : 9,098,792 B2  
APPLICATION NO. : 14/100049  
DATED : August 4, 2015  
INVENTOR(S) : Jae-min Shin et al.

Page 1 of 1

It is certified that error appears in the above-identified patent and that said Letters Patent is hereby corrected as shown below:

In the claims,

Claim 24, Column 21, Line 11

After "apparatus" insert --of--.

Signed and Sealed this  
Twenty-fourth Day of November, 2015

Michelle K. Lee  
*Director of the United States Patent and Trademark Office*